US008314598B2

United States Patent
Chen et al.

(10) Patent No.: US 8,314,598 B2
(45) Date of Patent: *Nov. 20, 2012

(54) CONTROL FOR REGULATOR FAST TRANSIENT RESPONSE AND LOW EMI NOISE

(75) Inventors: Wei Chen, Saratoga, CA (US); Michael Grimm, Los Altos Hills, CA (US)

(73) Assignee: Silergy Technology, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,920

(22) Filed: Feb. 16, 2012

(65) Prior Publication Data

US 2012/0153922 A1    Jun. 21, 2012

Related U.S. Application Data

(63) Continuation of application No. 12/454,875, filed on May 26, 2009, now Pat. No. 8,169,205.

(51) Int. Cl.
*G05F 1/00* (2006.01)
(52) U.S. Cl. ........................................... 323/282
(58) Field of Classification Search .................. 323/282, 323/284–288
See application file for complete search history.

(56) References Cited

U.S. PATENT DOCUMENTS

| | | | | |
|---|---|---|---|---|
| 5,739,658 | A * | 4/1998 | Thompson | 318/599 |
| 7,755,341 | B2 * | 7/2010 | Philbrick | 323/282 |
| 7,834,608 | B2 * | 11/2010 | Cheng et al. | 323/299 |
| 2009/0289612 | A1 * | 11/2009 | Hojo et al. | 323/290 |
| 2010/0207571 | A1 * | 8/2010 | English et al. | 320/101 |
| 2011/0043175 | A1 * | 2/2011 | Sohma | 323/282 |

* cited by examiner

*Primary Examiner* — Adolf Berhane
*Assistant Examiner* — Yemane Mehari
(74) *Attorney, Agent, or Firm* — Michael C. Stephens, Jr.

(57) ABSTRACT

Methods and circuits for power supply arrangement and control are disclosed herein. In one embodiment, a switching regulator can include: (i) a filter network coupled to an output terminal, where an output voltage is generated at the output terminal from an input source; (ii) an active switch to connect the input source to the filter network by periodically operating between on and off states over a switching period, where a duty cycle of the on state relative to the switching period is modulated based on a PWM control signal; (iii) a comparator receiving an output feedback signal, a hysteresis signal, and a reference level, and providing the PWM control signal therefrom; and (iv) a hysteresis programming circuit generating the hysteresis signal, and a ramp control signal, where the hysteresis signal is programmed based on conditions at the input source and the output voltage to achieve a pseudo constant frequency operation.

20 Claims, 7 Drawing Sheets

CONTROL FOR REGULATOR FAST TRANSIENT RESPONSE AND LOW EMI NOISE

CROSS REFERENCES TO RELATED APPLICATIONS

This application is a continuation of the following application, U.S. patent application Ser. No. 12/454,875, entitled "CONTROL FOR REGULATOR FAST TRANSIENT RESPONSE AND LOW EMI NOISE," filed on May 26, 2009, and which is hereby incorporated by reference as if it is set forth in full in this specification.

FIELD OF THE INVENTION

The present invention generally relates to the field of semiconductor devices. More specifically, embodiments of the present invention pertain to power regulation and control.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency voltage, and then filtering the high frequency input voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the input voltage source and the load to filter the switch output, and thus provide the output DC voltage. A controller (e.g., a pulse width modulator (PWM), a pulse frequency modulator, etc.) can be used to control the switch to maintain a substantially constant output DC voltage.

Switching voltage regulators are widely used in many of today's power management applications due to its relatively high power conversion efficiency. However, good transient responses may be difficult to achieve in switching regulators, as compared to linear regulators, because of the inclusion of an inductor-capacitor (LC) filter. In addition, the particular switching actions found in switching regulators may also generate more electromagnetic interference (EMI) type noise.

SUMMARY

Embodiments of the present invention relate to power regulators and/or supplies with improved regulator control.

In one embodiment, a switching regulator can include: (i) a filter network having an inductor and an output capacitor coupled to an output terminal, where an output voltage is generated at the output terminal from an input source; (ii) an active switch connecting the input source to the filter network, the active switch periodically operating between an on state and an off state over a switching period, where a duty cycle of the on state relative to the switching period is modulated based on a first control signal for regulation of the output voltage; (iii) a comparator that receives an output feedback signal based on the output voltage, a hysteresis signal, and a reference level, and provides the first control signal therefrom; and (iv) a hysteresis programming circuit configured to receive a second control signal derived from the first control signal, and to generate the hysteresis signal, and a ramp control signal, the ramp control signal being capacitively coupled to the output feedback signal, where the hysteresis signal is programmed based on conditions at the input source and the output voltage to achieve a pseudo constant frequency operation.

In another embodiment, a method of controlling a conversion of power from an input source into a regulated output voltage at an output terminal, can include: (i) controlling an active switch to connect the input source to a filter network that has an inductor and a capacitor coupled to the output terminal, the active switch periodically operating between an on state and an off state over a switching period; (ii) comparing an output feedback signal based on the output voltage, a hysteresis signal, and a reference level, and providing a first control signal therefrom, where a duty cycle of the on state relative to the switching period is modulated based on the first control signal for regulating the output voltage; (iii) generating a second control signal from the first control signal for controlling the duty cycle of the active switch; (iv) receiving the second control signal in a hysteresis programming circuit, and generating the hysteresis signal and a ramp control signal therefrom, the ramp control signal being capacitively coupled to the output feedback signal; and (v) programming the hysteresis signal based on conditions at the input source and the output voltage to achieve a pseudo constant frequency operation.

Embodiments of the present invention can advantageously provide for simplified control of power regulators and/or supplies, resulting in low cost switching regulators. Further, embodiments of the present invention are suitable for reduced electromagnetic interference (EMI) applications, and can provide a low switching ripple voltage while achieving good transient responses, and without using complex compensation designs. These and other advantages of the present invention will become readily apparent from the detailed description of preferred embodiments below.

DETAILED DESCRIPTION

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide for simplified control of power regulators and/or supplies, resulting in low cost switching regulators. Further, embodiments of the present invention can be suitable for reduced electromagnetic interference (EMI) applications, and can provide a low switching ripple voltage while achieving good transient responses without using complex compensation designs. The invention, in its various aspects, will be explained in greater detail below with regard to exemplary embodiments. However, even though particular examples use mainly a buck topology, controls and methods herein are not limited to this topology, and may be applied to other topologies, such as Sepic, Zeta, positive to negative, buck-boost, boost, forward, flyback, full-bridge, half-bridge and push-pull.

Figure 1A:
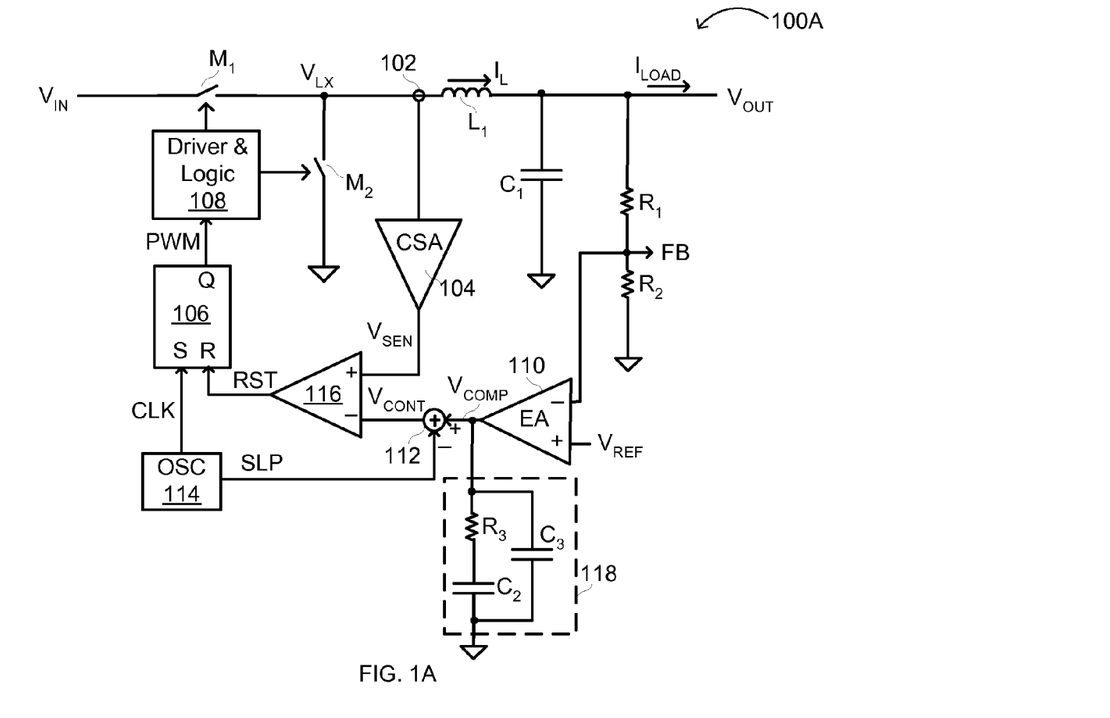
FIG. 1A is a schematic diagram of an example switching regulator with fixed frequency and peak current mode control.
Figure 1B:
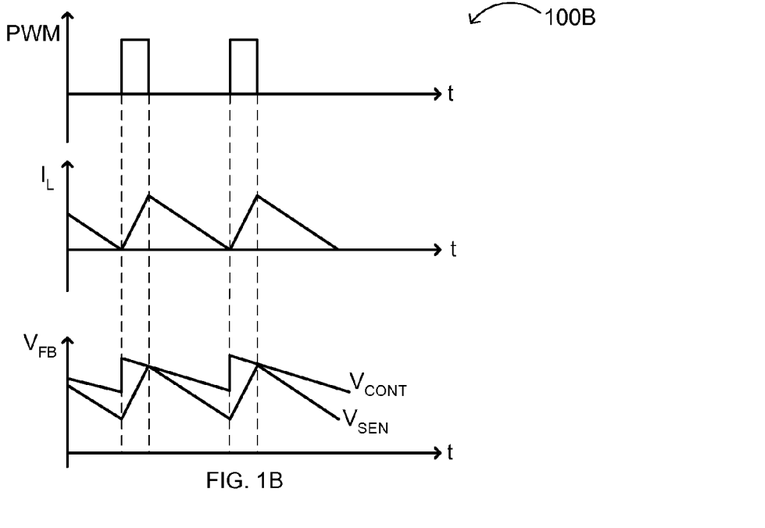
FIG. 1B is a waveform diagram showing example operation of the regulator shown in FIG. 1A.

Referring now to FIG. 1A, shown is a schematic diagram 100A of an example switching regulator with fixed frequency and peak current mode control. FIG. 1B shows a waveform diagram 100B of example operation of the regulator shown in FIG. 1A. This example shows a synchronous buck regulator adopting a fixed frequency peak current mode control.

In operation, a clock (CLK) from oscillator 114 may be used to turn on the top switch (e.g., transistor $M_1$) via R-S flip-flop 106 and logic/driver circuit 108, thus starting a switching cycle. The output voltage can be sensed (e.g., via resister divider network $R_1$ and $R_2$) and compared (via output feedback signal, FB) against a given reference (e.g., $V_{REF}$) to generate an error signal via error amplifier (EA) 110. This error signal from EA 110 may be subtracted at 112 by a slope compensation signal (SLP), which can be a "sawtooth" signal generated from oscillator 114, to generate a control signal input to comparator 116. This control signal can then be compared with sensed inductor current (e.g., via current detector 102 and current sensing amplifier (CSA) 104). If the peak inductor current ($I_L$) exceeds the sensed inductor current, the top switch $M_1$ may be turned off, and the rectifier or synchronous switch $M_2$ can conduct the current, lasting until the next clock arrives.

By limiting the switching frequency to about a fixed point, the design of an EMI filter can focus on switching noise at the switching frequency, and harmonic frequencies thereof. However, the peak energy at the switching frequency may be fairly high based on power levels and board layout. In addition, efforts must be invested to achieve proper performance from the peak current sense circuit (e.g., 102, 104), the clock generator (e.g., 114), the slope compensation and error amplifier (e.g., 110, 112) and its related compensation network (e.g., 118, including resistor $R_3$ and capacitors $C_2$ and $C_3$). Such designs may increase complexity and cost of the system, as well as increase end user difficulty as to proper compensation design to obtain good transient responses, while maintaining good stability margin under any line and load regulations.

Traditional hysteretic mode control is relatively simple, and may not require relatively complicated sub-circuits, such as current sense circuitry, clock generators, slope compensation circuitry, output feedback compensation, and so on. However, hysteretic mode control may not be practical in many of today's applications because of smaller ripple voltage requirements at very low supply voltages, as well as lagging ripple phases on low equivalent series resistance (ESR) ceramic output capacitors. In addition, such hysteretic mode control may have relatively poor short circuit protection, and a wide frequency range, thus potentially making EMI filter design more difficult.

Exemplary Switching Regulator Control Structure

In one example, a switching regulator includes: (i) a filter network coupled to an output terminal, where an output voltage is generated at the output terminal from an input source; (ii) an active switch to connect the input source to the filter network by periodically operating between on and off states over a switching period, where a duty cycle of the on state relative to the switching period is modulated based on a pulse width modulation (PWM) control signal; (iii) a comparator receiving an output feedback signal, a hysteresis signal, and a reference level, and providing the PWM control signal therefrom; and (iv) a hysteresis programming circuit generating the hysteresis signal, and a ramp control signal, where the hysteresis signal is programmed based on conditions at the input source and the output voltage to achieve a pseudo constant frequency operation.

Figure 2A:
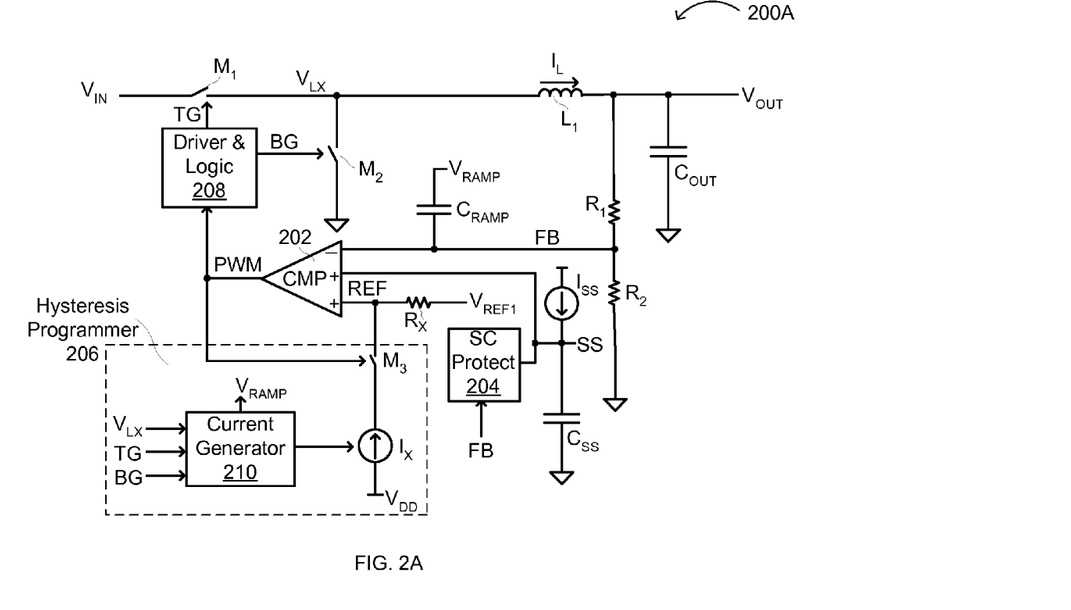
FIG. 2A is a schematic diagram of an example switching regulator in accordance with embodiments of the present invention.
Figure 2B:
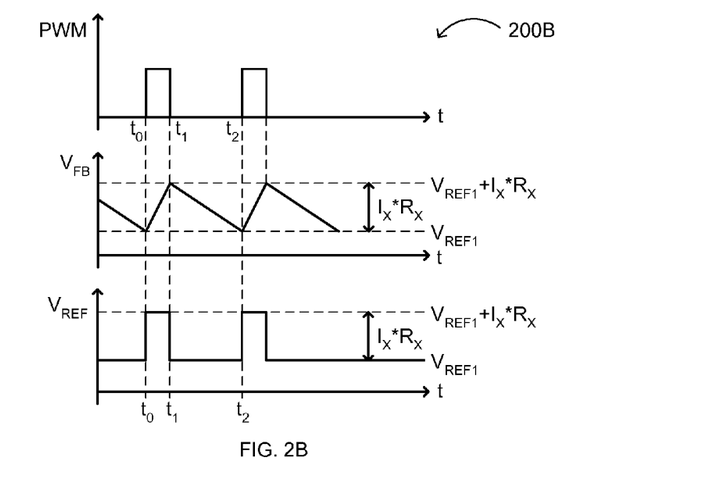
FIG. 2B is a waveform diagram showing example operation of the regulator shown in FIG. 2A.

Referring now to FIG. 2A, shown is a schematic diagram 200A of an example switching regulator in accordance with embodiments of the present invention. FIG. 2B shows a waveform diagram 200B of example operation of the regulator shown in FIG. 2A. In this particular example, the control circuitry does not include an error amplifier, an oscillator, or a current sense amplifier. As a result, the regulator of FIG. 2A is easier to implement and to use, as compared to that of FIG. 1A.

In FIG. 2A, the output voltage ($V_{OUT}$) may be sensed via a resistor divider (e.g., $R_1$ and $R_2$), and then summed with an AC ramp signal ($V_{RAMP}$) generated from hysteresis current generator block 210, to generate signal FB. For example, the $V_{RAMP}$ signal is a ramp signal in phase with inductor current $I_L$. Signal FB can be compared against a reference level (REF) to generate a PWM control signal for turning on/off main or top switch $M_1$ via control signal TG that is generated from driver/logic block 208.

In this fashion, hysteresis current generator 210 can be used in place of current sense, oscillator, and error amplifier circuitry, in order to simplify regulator control. In addition, short-circuit (SC) protection can be provided via SC protect circuit 204, whereby a soft start (SS) signal can also be provided to comparator 202. Comparator 202 can use a lower of the SS voltage and REF voltage to regulate the FB voltage. On the feedback side, ramp signal $V_{RAMP}$ that is in phase with the switching action, is provided. Thus in a buck regulator configuration, when switch $M_1$ turns on, and current $I_L$ increases, $V_{RAMP}$ may also increase. Further, when $M_1$ turns off to decrease current $I_L$, $V_{RAMP}$ can also decrease. The $V_{RAMP}$ signal (capacitively coupled to FB via $C_{RAMP}$) may resemble the feedback signal FB in both form and amplitude. In this fashion, an artificial ramp can be created that is larger in value than that of the output terminal, and that is in phase with the output feedback signal. Further, an error amplifier can be omitted from this configuration because the output voltage feeds through directly to comparator 202, for generation of control signal PWM.

As shown in FIG. 2B, at time instant $t_0$, $V_{FB}$ has decreased to reference level $V_{REF1}$, and switch $M_1$ is turned on. Between $t_0$ and $t_1$, inductor current $I_L$ increases, thus $V_{FB}$ also increases. At time instant $t_1$, $V_{FB}$ reaches $V_{REF1}I_X*R_X$, switch $M_1$ is turned off, and switch $M_2$ is turned on via control signals TG and BG. Then, $V_{FB}$ decreases as inductor current $I_L$ is reduced between $t_1$ and $t_2$. At time instant $t_2$, $V_{FB}$ again reaches the level of $V_{REF1}$, turning on $M_1$ to begin a new cycle. As shown in this particular example, a voltage at REF ($V_{REF}$) is essentially raised (e.g., by an amount $I_X*R_X$) and then decreased back to the $V_{REF1}$ level per switching cycle. This is done in hysteresis programmer 206 by hysteresis current $I_X$ generation, which is passed through switch $M_3$ using control signal PWM. Alternatively, such circuitry can be reversed such that reference voltage $V_{REF}$ is brought down and then raised up by an amount $I_X*R_X$. Thus, either such variation is contemplated in particular embodiments.

Figure 2C:
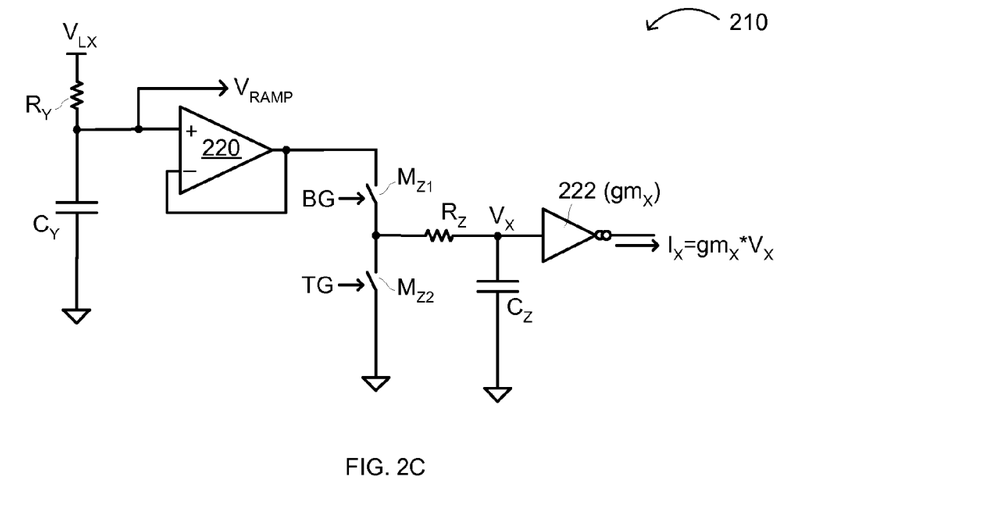
FIG. 2C is a schematic diagram of an example hysteresis current generator in accordance with embodiments of the present invention.

Referring now to FIG. 2C, shown is a schematic diagram 210 of an example hysteresis current generator in accordance with embodiments of the present invention. The hysteresis current generator 210 generates hysteresis current ($I_X$) that is proportional to $V_{OUT}*(1-V_{OUT}/V_{IN})$. Hysteresis current $I_X$ then programs the hysteresis of the PWM comparator (CMP) 202 via switch $M_3$. When the hysteresis of CMP 202 is made proportional to $V_{OUT}*(1-V_{OUT}/V_{IN})$, the switching frequency can be made pseudo constant under a continuous conduction mode (CCM) when inductor current $I_L$ remains flowing. Example values of $I_X*R_X$ include voltages in a range of from about 1 mV to about 200 mV, and including about 20 mV. In addition, particular functions or blocks shown in FIG. 2C can alternatively be implemented with other circuitry (e.g., a multiplier), in certain embodiments.

In some approaches, the frequency substantially varies when the input voltage (e.g., via switch node $V_{LX}$) changes. However, particular embodiments provide for a programmed hysteresis to make the switching frequency substantially constant. In this example, switch node $V_{LX}$ is integrated using an RC network (e.g., $R_Y$ and $C_Y$) to obtain an output voltage estimate ($V_{RAMP}$). $V_{RAMP}$ is then buffered via a unity gain amplifier 220, then provided to switch network $M_{Z1}$ and $M_{Z2}$ (via TG and BG control), filtered again (e.g., via $R_Z$ and $C_Z$), and then passed through transconductance amplifier 222 for conversion of the voltage into current $I_X$. As discussed above, current $I_X$ is thus proportional to the value: $V_{OUT}*(1-V_{OUT}/V_{IN})$, and $I_X$ programs the hysteresis in comparator 202.

Figure 2D:
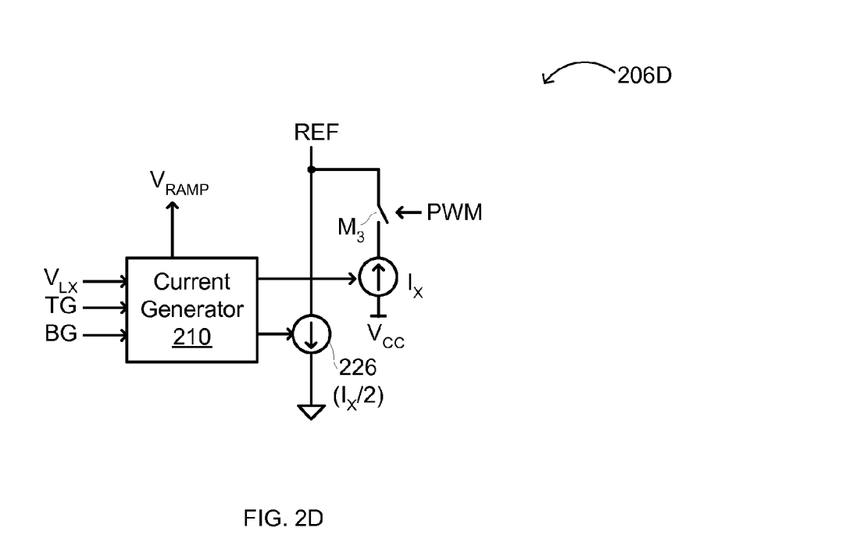
FIG. 2D is a schematic diagram of a first example hysteresis programmer in accordance with embodiments of the present invention.

Referring now to FIG. 2D, shown is a schematic diagram 206D of a first example hysteresis programmer in accordance with embodiments of the present invention. To eliminate errors due to the output voltage ($V_{OUT}$) being proportional to $V_{REF1}+I_X*R_X/2$, an offset current 226 (e.g., $I_X/2$) can be provided opposite to that of hysteresis current $I_X$ to reduce a DC voltage level on REF.

Figure 2E:
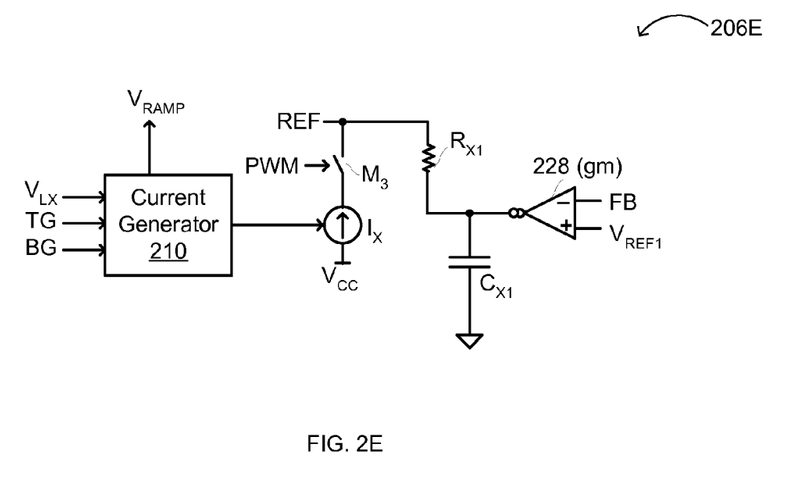
FIG. 2E is a schematic diagram of a second example hysteresis programmer in accordance with embodiments of the present invention.

Referring now to FIG. 2E, shown is a schematic diagram 206E of a second example hysteresis programmer in accordance with embodiments of the present invention. Even with the improved scheme shown in the example of FIG. 2D, DC regulation error may be introduced because the comparator CMP 202 may have different rising and falling delays. An integrator, as shown in the example of FIG. 2E, can be added to overcome this problem. Here, transconductance amplifier 228 may be used to correct for REF being pushed up when FB is lower than the targeted regulation level, $V_{REF1}$, and vice versa. In this example, the hysteresis can be $I_X*(R_X/R_{X1})$, where $R_X//R_{X1}$ represents an equivalent parallel resistance of resisters $R_X$ (see, e.g., FIG. 2A) and $R_{X1}$.

Under continuous conduction mode when the inductor current is continuous, the switching regulator may present the most serious EMI noise to the system and environment because of the hard-switching in the MOSFET switch and reverse recovery in the rectifier diode. Because circuits of particular embodiments can operate in a pseudo constant frequency condition, the frequency range of the EMI noise spectrum is known, making it easier to design associated EMI filters. Compared with other fixed frequency switching regulators having noise energy spikes at the switching frequency and harmonic frequencies thereof, such frequencies of particular embodiments are modulated slightly by input source and output load conditions, resulting in a small spread of the noise energy around a center switching frequency and its harmonics. Therefore, the peak of the noise energy can be reduced, allowing for a smaller associated EMI filter.

Figure 2F:
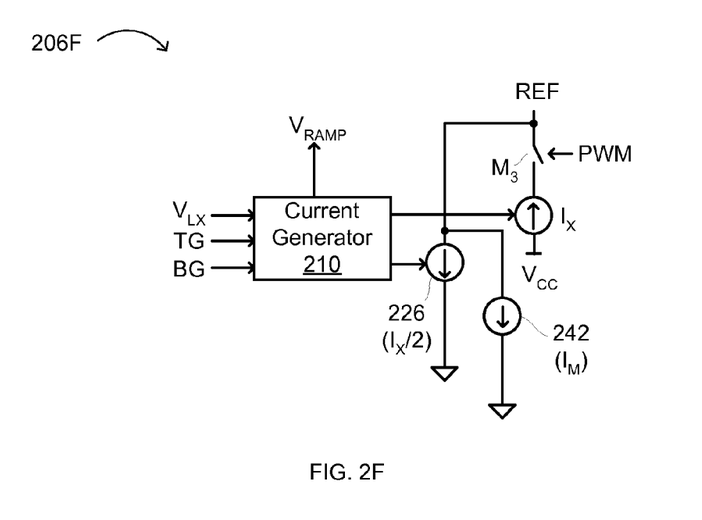
FIG. 2F is a schematic diagram of a third example hysteresis programmer to improve EMI noise performance in accordance with embodiments of the present invention.

Referring now to FIG. 2F, shown is a schematic diagram 206F of a third example hysteresis programmer to improve EMI noise performance in accordance with embodiments of the present invention. In this example, the hysteresis of PWM comparator CMP 202 can be slightly modulated by a signal 242 ($I_M$) that is, e.g., a white noise signal, and may have an average value of zero. Depending on particular applications, sinusoidal waveforms, trapezoidal waveforms or "sawtooth" waveforms can be used as modulation signal 242 for hysteresis adjustment. Also, any type of randomizer or random number generator-based signal can be used for modulation signal 242 ($I_M$).

Figure 2G:
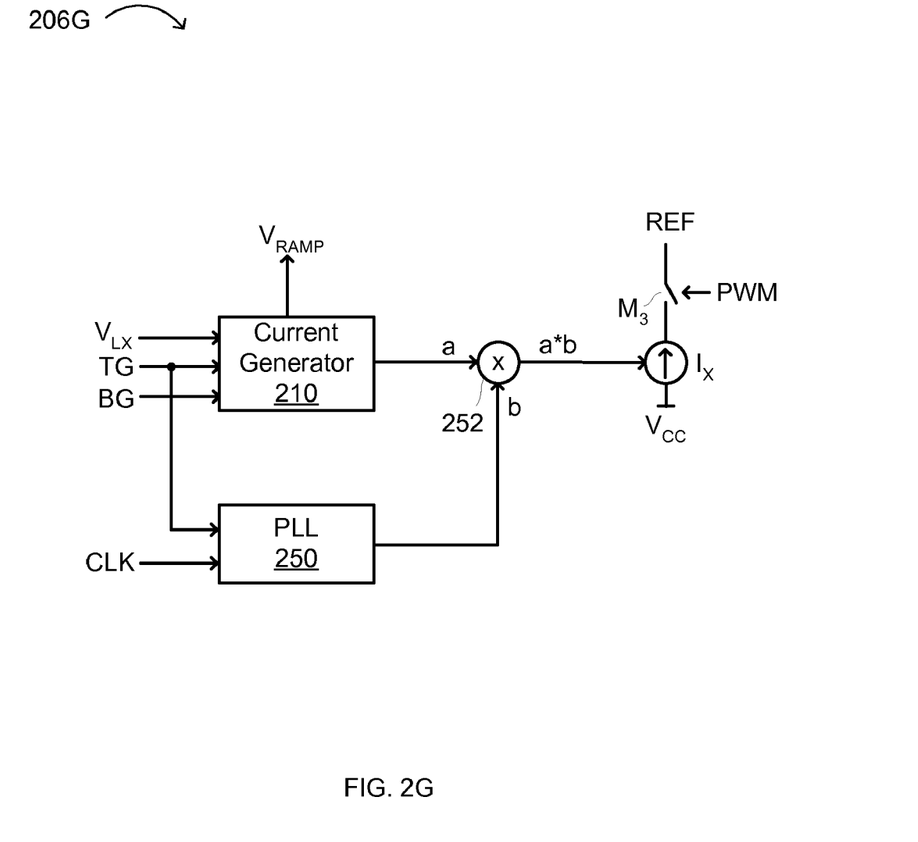
FIG. 2G is a schematic diagram of a fourth example hysteresis programmer using a PLL in accordance with embodiments of the present invention.

Referring now to FIG. 2G, shown is a schematic diagram 206G of a fourth example hysteresis programmer using a PLL in accordance with embodiments of the present invention. Hysteresis of the switch integrator can be modulated by an external clock signal CLK, and by using PLL 250 to allow hysteresis to be modulated according to a phase and/or frequency difference between switch control signal (TG) and the external CLK signal. Multiplier block 252 can receive an output from current generator 210 (a) and PLL 250 (b), to provide a multiplier signal (a*b) for control of hysteresis current $I_X$. This particular example may be suitable for multiple output and/or multi-phase applications.

Figure 3A:
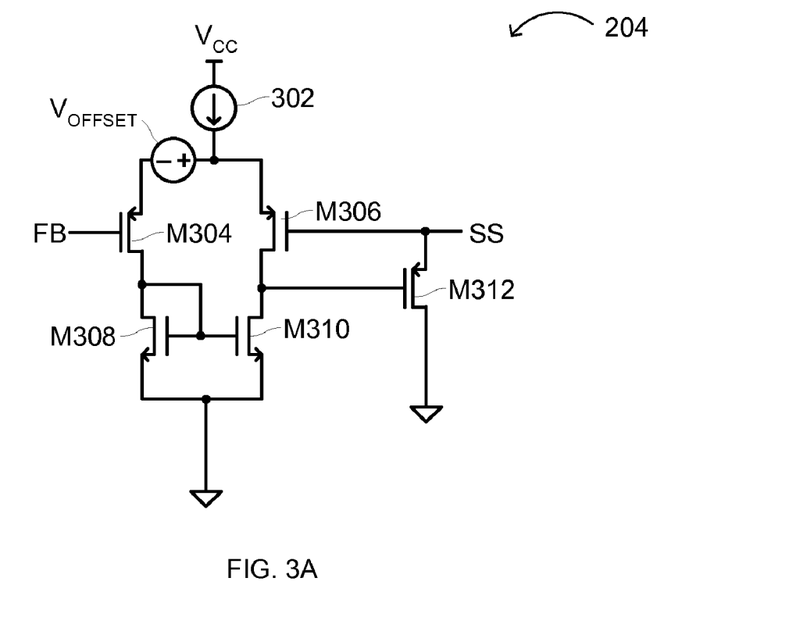
FIG. 3A is a schematic diagram of an example short circuit protection circuit in accordance with embodiments of the present invention.

Referring now to FIG. 3A, shown is a schematic diagram 204 of an example short circuit protection circuit in accordance with embodiments of the present invention. This circuit may be used for both soft start control and short-circuit protection. The soft start signal SS can reduce a DC regulation point at initial start up when $V_{OUT}$ is low (e.g., less than about 0.2V). Reducing the regulation point can minimize an "inrush" current from input source $V_{IN}$. Inrush current or input surge current refers to a maximum instantaneous input current drawn by an electrical device when the device is first turned on. Thus, a large current surge to charge output capacitor $C_{OUT}$ upon power up can be avoided using soft start control circuitry, whereby SS rising is controlled relative to an equilibrium value. A reference comparison voltage (e.g., REF) can effectively be ramped slowly because comparator 202 uses a lower of REF or SS for comparison against output feedback (FB), and a ramp of SS can be controlled via circuit 204. A traditional circuit to generate SS ramp voltage is "open loop," which applies a current on a capacitor to obtain a ramp signal. However, the SS voltage will eventually increase faster than the output under the abnormal conditions when the output capacitor is substantially large, or if the output is short circuited at startup. Circuit 204 of particular embodiments overcomes such limitations by clamping the SS voltage to a level that may be slightly above the FB voltage, thus allowing the SS voltage to ramp slower under above mentioned abnormal conditions.

In addition, to further decrease a duty cycle or inductor current ($I_L$) under short circuit conditions, the DC regulation point may be reduced by decreasing the SS voltage. The short-circuit protect circuit provides protection for an output short to ground, which can result in a DC bias discharging to ground, while FB remains high. This can result in saturation of the inductor current $I_L$ in attempting to overcome the DC bias. Thus in a short-circuit condition, SS can be controlled via PMOS transistor M312 such that reference level REF may be essentially ignored at comparator 202 when a short is detected from $V_{OUT}$ to ground. When FB goes lower than SS by at least offset voltage $V_{OFFSET}$, SS can be allowed to charge via current source $I_{SS}$. Thus, circuit 204 including current source 302, and the differential amplifier structure with PMOS transistors M304/M306 and NMOS transistors M308/M310 can be used to essentially clamp SS to FB+$V_{OFFSET}$. For example, $V_{OFFSET}$ (e.g., about 60 mV) can be selected to be from about 10 % to about 15% of nominal reference voltage $V_{REF1}$ (e.g., about 600 mV), or any suitable offset values allowing for normal transient conditions.

Figure 3B:
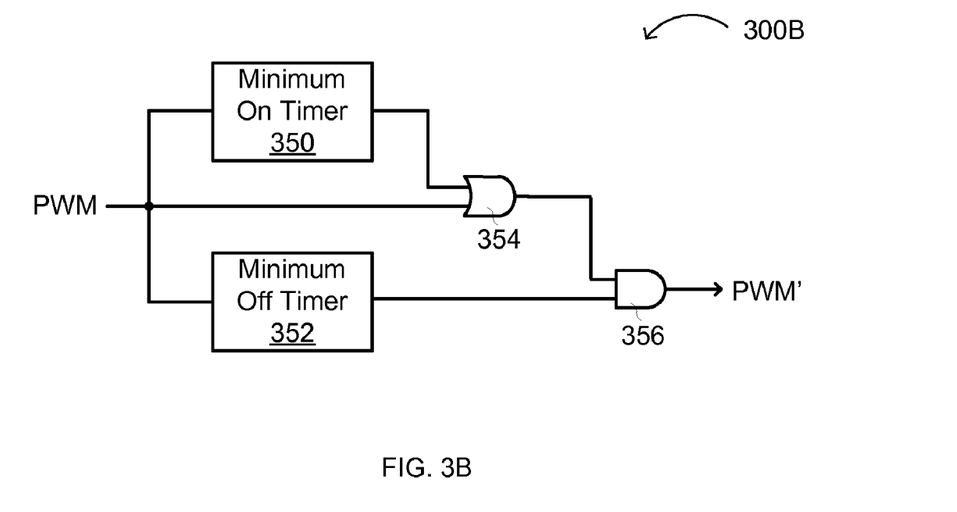
FIG. 3B is a block schematic diagram of an example pulse width modulation (PWM) control circuit in accordance with embodiments of the present invention.

Referring now to FIG. 3B, shown is a block schematic diagram 300B of an example PWM control circuit in accordance with embodiments of the present invention. For example, circuit 300B can be used to modify control signal PWM after comparator 202, with modified control signal PWM' being connected to driver logic 208. As shown, incoming control signal PWM can connect to minimum on-time programmer 350 and minimum off time programmer 352, as well as OR-gate 354. Outputs from OR-gate 354 and minimum off time programmer 352 can be input to AND-gate 356 for generation of signal PWM'.

When the duty cycle of the switching regulator is relatively small (e.g., the resulting on time of the main switch is less than about 50 ns) or relatively large (e.g., the resulting off time of the main switch is less than about 50 ns), propagation delays in the PWM comparator 202, and digital logic/driver 208, may become comparable to the minimum on or off times of high side switch $M_1$. To avoid substantial switching transition losses, and potential stability problems, programmable (e.g., user programmable) minimum on/off time limits shown in the example circuit of FIG. 3B can be added to the gate logic in driver/logic circuit 208 for high and low side switches $M_1$ and $M_2$. This additional phase delay still allows the regulator to switch at a very high frequency when in normal operation ranges where the duty cycle is not very large or very small, while maintaining superior transient responses. However, when the regulator operates in minimum on/off time regions, the switching period may be stretched longer to maintain the output voltage regulation with minimum switching ripples.

Exemplary Method of Controlling a Power Regulator

In one example, a method of controlling a conversion of power from an input source into a regulated output voltage at an output terminal, includes: (i) controlling an active switch to connect the input source to a filter network that has an inductor and a capacitor coupled to the output terminal, the active switch periodically operating between an on state and an off state over a switching period; (ii) comparing an output feedback signal based on the output voltage, a hysteresis signal, and a reference level, and providing a first control signal therefrom, where a duty cycle of the on state relative to the switching period is modulated based on the first control signal for regulating the output voltage; (iii) generating a second control signal from the first control signal for controlling the duty cycle of the active switch; (iv) receiving the second control signal in a hysteresis programming circuit, and generating the hysteresis signal and a ramp control signal therefrom, the ramp control signal being capacitively coupled to the output feedback signal; and (v) programming the hysteresis signal based on conditions at the input source and the output voltage to achieve a pseudo constant frequency operation.

Figure 4:
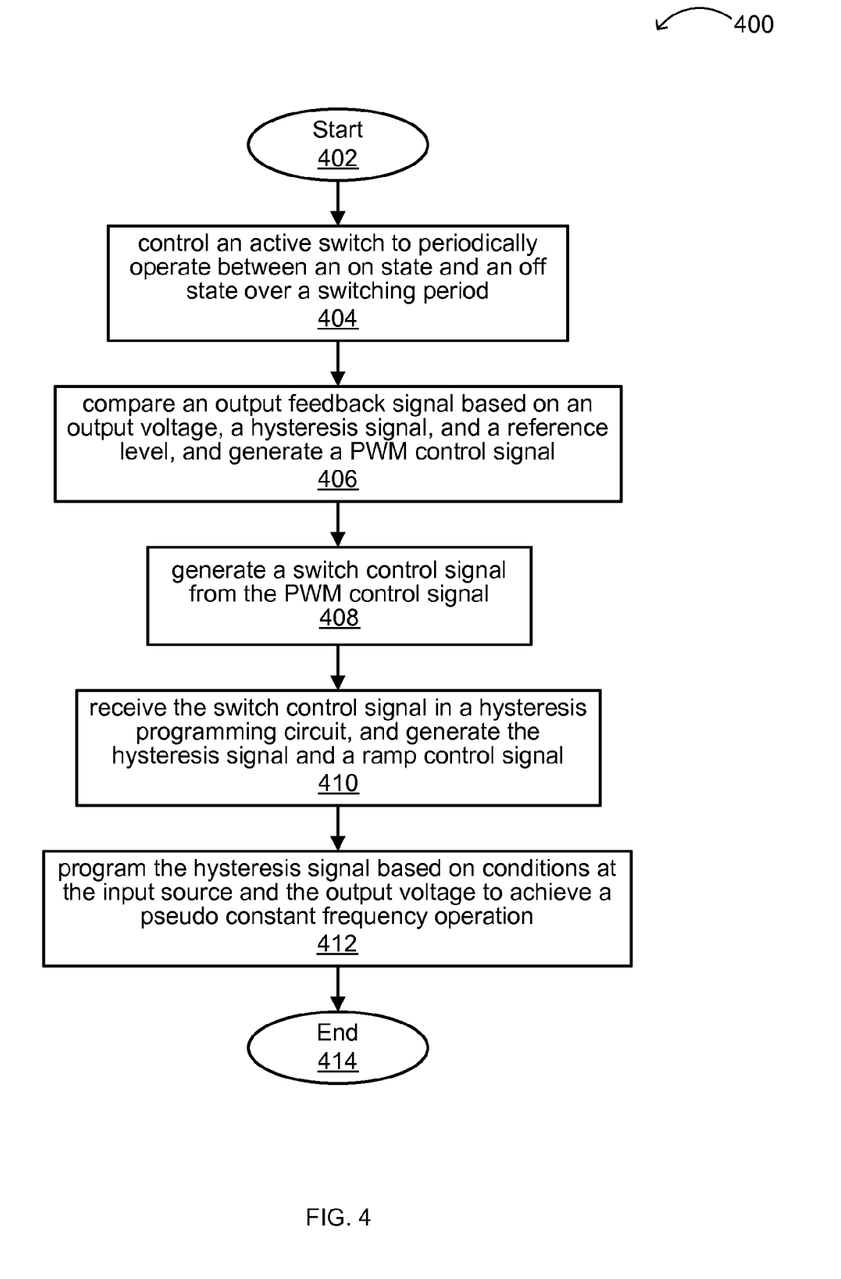
FIG. 4 is a flow diagram showing an example method of controlling a switching regulator in accordance with embodiments of the present invention.

Referring now to FIG. 4, shown is a flow diagram 400 of an example method of controlling a switching regulator in accordance with embodiments of the present invention. The flow begins (402), and an active switch (e.g., $M_1$) can be controlled to periodically operate between on and off states over a switching period (404). An output feedback signal (e.g., FB) based on the output voltage can be compared against a hysteresis signal (e.g., $I_X$), and a reference level (e.g., REF), to generate a PWM control signal (406). A switch control signal (e.g., TG) can be generated from the PWM control signal (408). The switch control signal can be received in a hysteresis programming circuit (e.g., 206) that then generates the hysteresis signal and a ramp control signal (410). The hysteresis signal can be programmed based on conditions at the input source and the output voltage (e.g., via $V_{LX}$ and FB) to achieve a pseudo constant frequency operation (412), completing the flow (414).

As shown in various examples herein, regulators employ an inductor-based switching regulator topology. However, any suitable type of regulator (e.g., transformer-based switching regulators, charge pump regulator circuit topologies, boost regulator, buck-boost, flyback, positive to negative, forward, half-bridge, full-bridge, push-pull, etc.) can be used in certain embodiments. In addition, particular hysteresis current generators are shown in examples herein in order to provide for fast transient responses and lower EMI, but other types of current and/or hysteresis generators can also be used in particular embodiments.

Any suitable input and regulated output voltages can be accommodated in particular embodiments. For example, in a buck step down type of regulator, an input voltage can range from about 2.5 V to about 5.5 V, such as from about 2.7 to about 4.2 V, and including about 4.2 V. Regulated output voltages in such a step down regulator example can range from about 0.8 V to about 2.2 V, and including from about 1 V to about 1.8 V, and more specifically about 1.5 V. For example, some such voltages can apply in a cell phone application, and can be utilized for main chip power, random-access memory (RAM) power, or the like.

While the above examples include circuit and structural implementations of certain regulators, one skilled in the art will recognize that other technologies and/or regulator structures can be used in accordance with embodiments. Further, one skilled in the art will recognize that other device circuit arrangements, elements, and the like, may also be used in accordance with embodiments. Also, while control circuitry described above can be implemented using AND-gates, OR-gates, S-R flip-flops, detectors, comparators, and/or amplifiers, particular embodiments are also applicable to other circuit components. Also, methods and circuits discussed herein can also be applied to different switching devices (e.g., a PMOS transistor, BJT devices, etc.), and to different topologies (e.g., forward, half bridge, full bridge, etc.) converters.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A switching regulator, comprising:
   a) a filter network having a magnetic component and an output capacitor coupled to an output terminal, wherein an output voltage is generated at said output terminal from an input source;
   b) an active switch configured to connect said input source to said filter network, said active switch periodically operating between an on state and an off state over a switching period, wherein a duty cycle of said on state relative to said switching period is modulated based on a first control signal for regulation of said output voltage;
   c) a comparator configured to receive an output feedback signal based on said output voltage, a hysteresis signal, and a reference level, and to provide said first control signal therefrom, wherein said hysteresis signal is configured to be summed with said reference level when said first control signal is active; and
   d) a hysteresis programming circuit configured to receive a second control signal derived from said first control signal, and to generate said hysteresis signal and a ramp control signal, said ramp control signal being capacitively coupled to said output feedback signal, said ramp control signal being configured to operate in phase with said periodic operation of said active switch, wherein said hysteresis signal is generated based on said ramp control signal to achieve a pseudo constant frequency operation of said active switch.

2. The switching regulator of claim 1, further comprising a hysteresis modulation circuit to modulate said hysteresis signal to reduce a peak electromagnetic interference (EMI) from said switching regulator.

3. The switching regulator of claim 1, further comprising a soft start circuit that provides a soft start reference voltage to said comparator, wherein said soft start reference voltage is initially discharged by said soft start circuit to reduce inrush current at initial startup or output short circuit conditions of said switching regulator.

4. The switching regulator of claim 3, wherein said soft start reference voltage is limited to a predetermined offset above said output feedback signal.

5. The switching regulator of claim 1, configured as a buck step down regulator, wherein said first control signal comprises a pulse width modulation (PWM) signal.

6. The switching regulator of claim 5, wherein said hysteresis programming circuit receives one or more signals reflecting a voltage $V_{IN}$ at said input source and said output voltage $V_{OUT}$, to provide hysteresis that is proportional to $V_{OUT}^*(1-V_{OUT}/V_{IN})$.

7. The switching regulator of claim 1, wherein a topology of said switching regulator is selected from a group consisting of: buck, Sepic, Zeta, positive to negative, buck-boost, boost, forward, flyback, full-bridge, half-bridge and push-pull.

8. The switching regulator of claim 1, wherein said hysteresis programming circuit receives a voltage from a node of said active switch to generate said ramp control signal.

9. The switching regulator of claim 1, wherein said hysteresis programming circuit is configured to provide an offset current opposite to that of said hysteresis signal.

10. The switching regulator of claim 1, wherein:
    a) a sum of said output feedback signal and said ramp control signal increases monotonically in said on state; and
    b) said sum of said output feedback signal and said ramp control signal decreases monotonically in said off state.

11. The switching regulator of claim 1, wherein a logic circuit receives said first control signal and generates a modified first control signal for generation of said second control signal to provide a minimum time for said on state of said active switch such that a low output ripple is maintained at a low duty cycle operation.

12. The switching regulator of claim 1, wherein a logic circuit receives said first control signal and generates a modified first control signal for generation of said second control signal to provide a minimum time for said off state of said active switch such that a low output ripple is maintained at a high duty cycle operation.

13. A method of controlling a conversion of power from an input source into a regulated output voltage at an output terminal, the method comprising:
    a) controlling an active switch to connect said input source to a filter network, said filter network having an inductor and a capacitor coupled to said output terminal, said active switch periodically operating between an on state and an off state over a switching period;
    b) comparing an output feedback signal based on said output voltage, a hysteresis signal, and a reference level, and providing a first control signal therefrom, wherein a duty cycle of said on state relative to said switching period is modulated based on said first control signal for regulating said output voltage;
c) summing said hysteresis signal with said reference level when said first control signal is active;
d) generating a second control signal from said first control signal for controlling said duty cycle of said active switch;
e) receiving said second control signal in a hysteresis programming circuit, and generating said hysteresis signal and a ramp control signal therefrom, said ramp control signal being capacitively coupled to said output feedback signal, said ramp control signal operating in phase with said periodic operation of said active switch; and
f) generating said hysteresis signal based on said ramp control signal to achieve a pseudo constant frequency operation of said active switch.

14. The method of claim 13, wherein said generating said hysteresis further comprises modulating said hysteresis such that an operation frequency matches a frequency of an external clock.

15. The method of claim 13, wherein said generating said hysteresis further comprises modulating said hysteresis using a modulation signal to reduce electromagnetic interference (EMI) noise.

16. The method of claim 15, wherein said modulation signal comprises a white noise signal.

17. The method of claim 13, wherein said generating said hysteresis signal comprises receiving one or more signals reflecting voltage $V_{IN}$ at said input source and said output voltage $V_{OUT}$, and providing therefrom, hysteresis that is proportional to $V_{OUT}^*(1-V_{OUT}/V_{IN})$.

18. The method of claim 13, wherein said generating said ramp control signal comprises making a phase of said ramp control signal that is in phase with that of a current through said inductor.

19. The method of claim 13, wherein:
a) said providing said first control signal comprises providing a minimum time for said on state of said active switch such that a low output ripple is maintained at a low duty cycle operation; and
b) said providing said first control signal comprises providing a minimum time for said off state of said active switch such that a low output ripple is maintained at a high duty cycle operation.

20. An apparatus for controlling a conversion of power from an input source into a regulated output voltage at an output terminal, the apparatus comprising:
a) means for controlling an active switch to connect said input source to a filter network, said filter network having an inductor and a capacitor coupled to said output terminal, said active switch periodically operating between an on state and an off state over a switching period;
b) means for comparing an output feedback signal based on said output voltage, a hysteresis signal, and a reference level, and providing a first control signal therefrom, wherein a duty cycle of said on state relative to said switching period is modulated based on said first control signal for regulating said output voltage;
c) means for summing said hysteresis signal with said reference level when said first control signal is active;
d) means for generating a second control signal from said first control signal for controlling said duty cycle of said active switch;
e) means for receiving said second control signal in a hysteresis programming circuit, and generating said hysteresis signal and a ramp control signal therefrom, said ramp control signal being capacitively coupled to said output feedback signal, said ramp control signal operating in phase with said periodic operation of said active switch; and
f) means for generating said hysteresis signal based on said ramp control signal to achieve a pseudo constant frequency operation of said active switch.

* * * * *